US012766399B2

(12) United States Patent
Holbrook

(10) Patent No.: US 12,766,399 B2
(45) Date of Patent: Oct. 20, 2026

(54) METHOD AND APPARATUS FOR PROVIDING WIND INFORMATION

(71) Applicant: Tagmarshal International Limited, Cork (IE)

(72) Inventor: Benjamin Holbrook, Mill Valley, CA (US)

(73) Assignee: Tagmarshal International Limited, Cork (IE)

(*) Notice: Subject to any disclaimer, the term of this patent is extended or adjusted under 35 U.S.C. 154(b) by 0 days.

(21) Appl. No.: 19/336,366

(22) Filed: Sep. 22, 2025

(65) Prior Publication Data

US 2026/0084038 A1 Mar. 26, 2026

Related U.S. Application Data

(60) Provisional application No. 63/697,934, filed on Sep. 23, 2024.

(51) Int. Cl.

| | |
|---|---|
| ***A63B 71/06*** | (2006.01) |
| ***A63B 102/32*** | (2015.01) |
| ***G01W 1/02*** | (2006.01) |

(52) U.S. Cl.

CPC .......... *A63B 71/0622* (2013.01); *G01W 1/02* (2013.01); *A63B 2102/32* (2015.10)

(58) Field of Classification Search

CPC .. A63B 71/0622; A63B 2102/32; G01W 1/02

See application file for complete search history.

(56) References Cited

U.S. PATENT DOCUMENTS

| | | | | |
|---|---|---|---|---|
| 10,795,055 B2* | 10/2020 | Lambert | ................ | G01W 1/06 |
| 2018/0203159 A1* | 7/2018 | Lambert | ................ | G01W 1/04 |

* cited by examiner

*Primary Examiner* — Brian O Peters

(74) *Attorney, Agent, or Firm* — JD Harriman; Foundation Law Group LLP

(57) ABSTRACT

The present system provides a sensor for determining and communicating wind speed and direction at a golf hole or golf driving range or any place golf is played or practiced, an indoor or outdoor location. In an embodiment, an anemometer is positioned on or near a flagstick and wirelessly transmits wind data to a receiving device accessible by a golfer. The apparatus may be configured as an attachment or integrated flagstick assembly, powered by a battery, solar charging, or both. In some embodiments, the apparatus incorporates position-determining technology to provide accurate location data of the wind device, and may further collect pace-of-play information. Data may be displayed on course-mounted units, golf cart mounted displays, on pull cart displays, handheld devices, or wearable devices, and can include real-time wind, flagstick position, and distance information.

20 Claims, 5 Drawing Sheets

METHOD AND APPARATUS FOR PROVIDING WIND INFORMATION

This patent application claims priority to U.S. Provisional Patent Application 63/69,934 filed Sep. 23, 2024, which is incorporated by reference herein in its entirety.

BACKGROUND OF THE SYSTEM

Determining wind speed and direction is often critical. This is particularly true in sports, where wind can significantly alter the trajectory of a moving object. For example, in golf, wind can push or lift a golf ball off its intended line of flight; in tennis, it can disrupt ball spin and placement; in baseball, it can carry or suppress fly balls; and in motor sports, it can affect both aerodynamics and handling. Devices such as handheld anemometers and smartphone weather applications exist to measure wind, but these tools typically provide only localized or remote estimates and are not practical for use in real-time sporting play.

Golf presents a particularly challenging environment because of the large distances and varying topographies and altitudes involved with the sport. The wind at the tee, where the golfer strikes the ball, may differ substantially from the wind at the green, where the ball is intended to land. Moreover, the ball often travels above the height of trees or flagsticks, encountering conditions not observable from the ground. Traditionally, golfers rely on indirect indicators—such as the movement of the flag on the green, rustling leaves on nearby trees, or grass movement at the tee—to infer wind conditions. While these methods are common and even recommended in instructional materials, they are inherently subjective, inconsistent, and limited to surface-level observations. Commercial rangefinders and golf GPS devices sometimes attempt to provide wind information, but these typically rely on data from nearby weather stations rather than on-course measurements, and therefore may not reflect actual play conditions. Accordingly, existing approaches are not sufficiently accurate or reliable for golfers seeking precise, real-time understanding of wind effects during play.

SUMMARY

The present system provides an apparatus for determining and communicating wind speed and direction at a golf hole, golf driving/practice range or any indoor or outdoor practice area. In one embodiment, a sensor is positioned on or near the flagstick of the hole and wirelessly transmits wind data to a receiving device accessible by a golfer. The sensor may be configured as an add-on attachment to a standard flagstick or as an integrated flagstick assembly. Power may be provided by a battery, a solar charging system, or a combination thereof. In addition to golf, the sensor may be used in other activities where localized wind information is valuable, such as motor sports, construction, or outdoor events.

In an embodiment, the sensor also incorporates position-determining technology, such as a GPS receiver, to provide accurate wind and flagstick location data in addition to wind information. Communication between the sensor and external devices may be accomplished through a variety of wireless protocols. The system may also integrate sensors capable of detecting flagstick movement or player interactions, enabling additional data collection such as pace-of-play metrics.

In certain embodiments, one or more display units may be positioned on the golf course, such as at tee boxes or fairway locations, to present information received from the sensor. The displays may provide golfers with real-time wind speed and direction, as well as updated distance and flagstick location information. In other embodiments, the data may also be transmitted directly to handheld or wearable devices carried by players, to displays in a golf cart, or to any desirable display device.

The system may further be configured to calculate distances from the display location to the hole, dynamically adjust for flagstick relocations, and provide error handling or feedback when signal quality or measurement accuracy is compromised. By delivering precise, real-time wind speed and direction along with flagstick position data, the present system offers golfers and other users a significant improvement over traditional methods of visually estimating wind or relying on remote weather reports.

DETAILED DESCRIPTION OF THE SYSTEM

The present system provides a sensor for determining and communicating wind speed and direction at a golf hole, driving range or anywhere golfers play or practice golf. The system contemplates a communication system, display system, and communication system for providing real-time wind speed and direction, distance information, and the like for all holes on the course, as well as locations between the tee and green.

System

Figure 1:
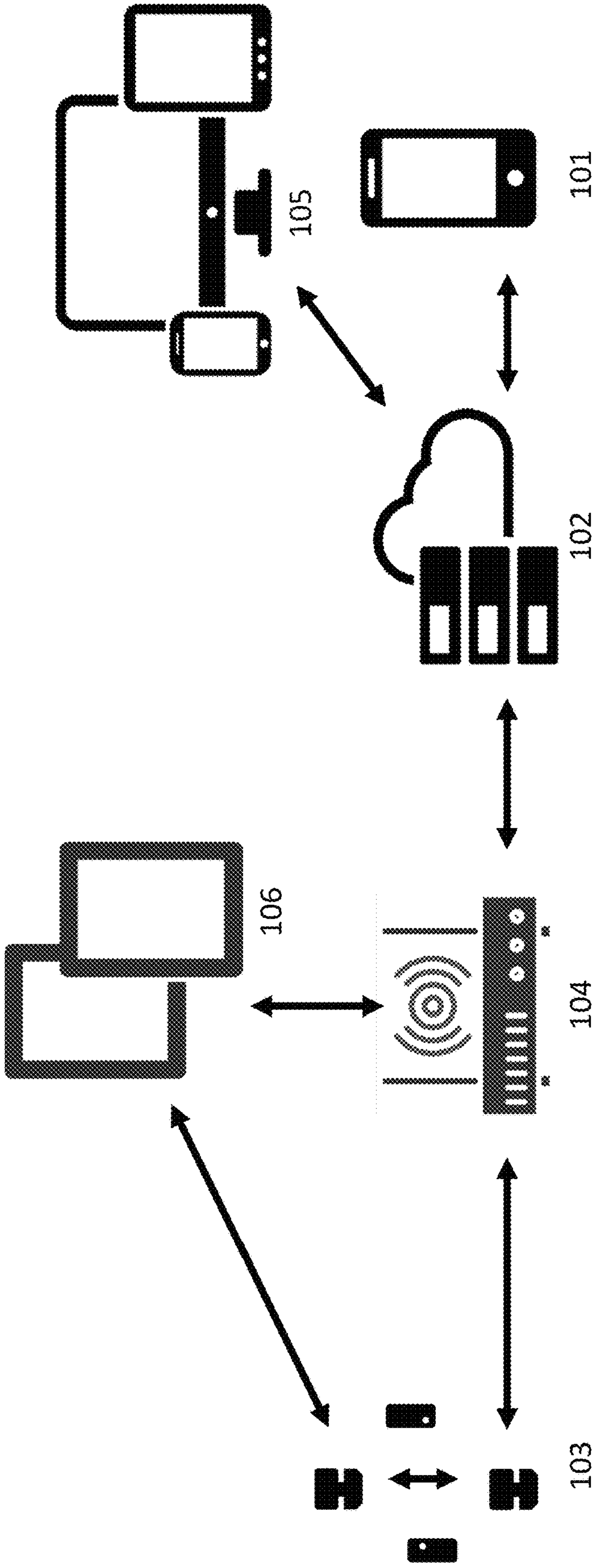
FIG. 1 illustrates a system for detecting and communicating wind and other information in an embodiment.

As shown in FIG. 1, a system is provided for determining and communicating wind and location information on a golf course, or driving range or any area golfers play. A sensor 103 mounted on or near a flagstick or target, as well as at other locations in golf related venues, incorporates a wind speed sensor (and other devices) configured to measure wind speed and direction at the hole. Sensor 103 communicates wirelessly with an aggregating gateway 104, which transmits data to a cloud service 102 through wired, Wi-Fi, cellular, or other wireless networks. The gateway 104 may also be a satellite. A user device 101, such as a smartphone, handheld rangefinder, golf cart display, mounted display, or wearable, receives real-time or near real-time updates from cloud 102 to present golfers with current wind and distance data.

The system can also transmit data to dashboards on devices such as computers, smartphones, tablets, and the like 105 that allow management of the system, installation of updates, and tracking of information.

In an embodiment, communication between sensor 103 and gateway 104 occurs over a wireless communication system (e.g. LoRa or LoRaWAN network), thereby enabling reliable long-range connectivity without reliance on cellular, Wi-Fi, or Bluetooth systems. Each sensor 103 may be paired with a specific hole so that only data from the assigned flagstick is communicated to displays and golfer devices, even if flagsticks are relocated during daily course setup.

In an embodiment, the system further includes outdoor display units 106 located at fixed positions on the golf course, such as tee boxes, fairways, or rough areas. Display units 106 may be solar powered, weatherproof, and configured with high-visibility screen for readability in both direct sunlight and shaded conditions. Each display 106 receives data wirelessly and presents wind speed and direction periodically (e.g. at approximately one-second intervals during daylight hours), as well as distances to the front, flagstick, and back of the green. In an embodiment, the display units 106 may act as repeaters for the data signals as well.

In an embodiment, sensor 103 periodically transmits updated GPS coordinates (e.g. in the morning when flagstick locations are established), allowing display units 106 and user devices 101 to dynamically update distance calculations. Distance may be determined using geospatial calculation methods, such as the haversine formula, based on GPS data from both sensor 103 and the receiving device. In the event of sensor or transmission error, display 106 may revert to showing default information, such as center-green distance without wind data, and may also provide error feedback to indicate the data status. The system may also use other positioning techniques, including, for example, Post-Processed Kinematics (PPK).

In an embodiment, sensor 103 includes solar panels and a rechargeable battery for continuous outdoor operation. Power management features may include light-based wake cycles, low-power sleep modes, and diagnostic reporting to the cloud 102. The system may also incorporate additional sensors for detecting flagstick movement or player interaction, enabling collection of pace-of-play data that can be aggregated by gateway 104 and transmitted to cloud 102 for analysis.

In an embodiment, one or more cameras and/or motion detectors are included in either the sensor 103, or located separately near the green. This can be used to detect when players have entered and exited the green, providing useful data on pace of play for course marshals, players, and course management.

Sensor 103 Components

Figure 2:
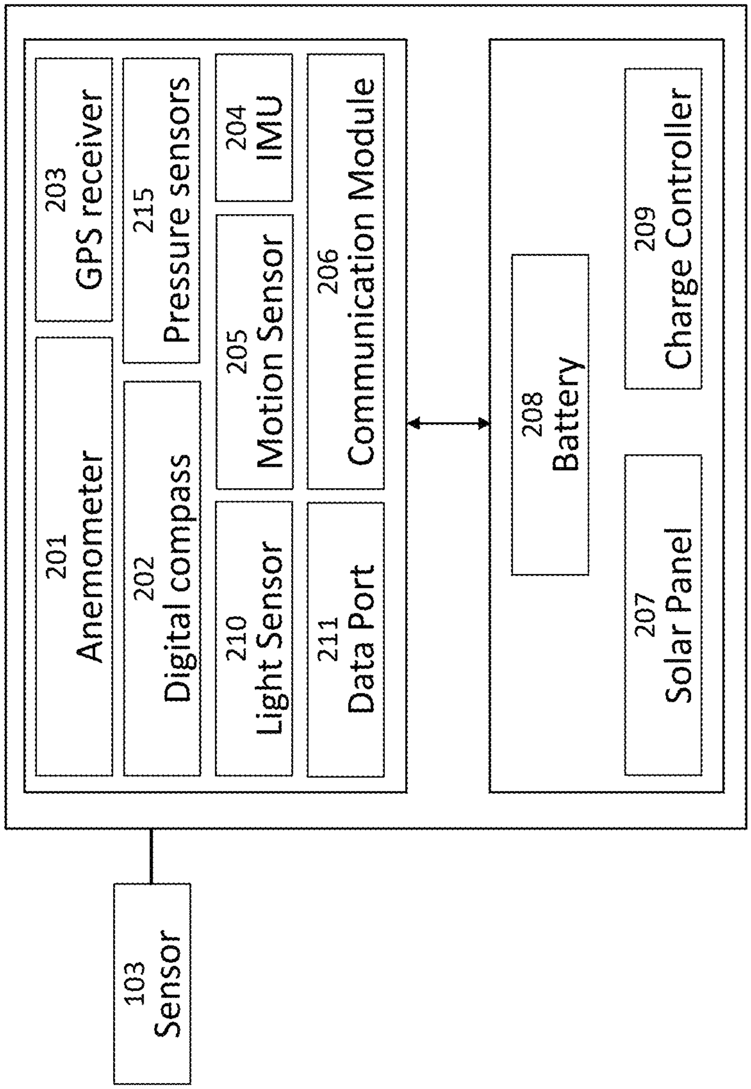
FIG. 2 illustrates a sensor in an embodiment.

FIG. 2 illustrates components of sensor 103 in an embodiment. Sensor 103 is mounted on a golf flagstick and configured to measure environmental and positional data. In an embodiment, sensor 103 includes a detector 201 (e.g. anemometer) configured to measure wind speed and direction, for example at approximately one-second intervals during daylight hours. A direction detector 202 (e.g. digital compass) is provided to maintain accurate directional reference, and may recalibrate north when the flagstick is rotated or repositioned during play. A GPS (or other type of positioning) module 203 determines location coordinates and may transmit updated flagstick positions periodically, such as once per morning, to support accurate distance calculations throughout the system.

The wind speed and direction detector may be implemented in a number of ways. In one embodiment, the system may employ a pressure-based probe arrangement 215. For example, the system may use a three-channel, two-component wind probe which utilizes differential pressure measurements from multiple sampling ports arranged circumferentially around a cylindrical body. In such an arrangement, three pressure ports are distributed at 120° intervals around the probe surface, with reference pressure taken from additional ports located near the probe base. The magnitude of the surface pressure at each port varies as a function of yaw angle, with a maximum value when the port faces directly into the flow. By simultaneously analyzing both the mean differential pressures and the temporal variances of these signals, ambiguities inherent in multi-port probes can be resolved, thereby allowing both wind speed and direction to be estimated over 360° in yaw. Dynamic pressure scaling is employed to determine flow speed, while pressure variance is used as an independent variable to improve angular accuracy, especially at low velocities.

In another embodiment, the wind speed and direction detector may comprise an ultrasonic anemometer, in which transducers transmit and receive ultrasonic pulses between pairs of sensors. The transit time of the pulses is affected by the wind velocity component along the propagation path. By combining measurements from multiple axes, both speed and direction can be determined with high accuracy and without moving parts.

In other embodiments, the system may employ hot-wire or hot-film anemometry, in which the cooling effect of airflow over a heated element is related to the flow speed, and angular sensitivity is obtained by orienting multiple elements at different positions. Similarly, optical anemometers may use laser Doppler velocimetry or particle image velocimetry to infer flow velocity from scattered light patterns. Still further embodiments may employ mechanical methods, such as cup anemometers or vane-type sensors, which rely on rotational or deflection response to wind flow.

Accordingly, the system is not limited to any particular wind speed or direction measuring technology. Rather, any suitable method and apparatus capable of producing sufficiently accurate speed and directional data under outdoor environmental conditions may be employed.

In an embodiment, sensor 103 includes a nine-axis inertial measurement unit (IMU) 204 that detects movement of the flagstick, such as when the flagstick is removed from the golf hole and laid flat. IMU 204, together with motion or proximity sensors 205, may also detect player presence on or around the green to support pace-of-play monitoring.

In an embodiment, sensor 103 may incorporate a communication module 206 configured to transmit data using LoRa or LoRaWAN protocols. Communication module 206 may broadcast wind, location, and diagnostic information to a gateway device 104, while also transmitting real-time wind data to local display units on the same hole. Each sensor 103 may include a unique identifier associated with its assigned hole, and this identifier may be updated dynamically based on GPS module 203 data when a flagstick is relocated.

In an embodiment, the sensor may not have a communication module. In that embodiment, the sensor 103 may contain a plurality of lights of different colors to indicate wind speed and direction. There may be a different color, or combination of colors to represent wind speed and direction. In an embodiment, the lights may be constant for no wind, and flash at increasing frequency for greater wind speeds. In an embodiment, the sensor may include the lights even if a communication module is present, to provide information should the communication module fail.

In an embodiment, sensor 103 transmits wind speed and direction data at approximately one update per second. To conserve energy, sensor 103 may suspend transmission when measured wind speed remains unchanged, resuming broadcasts only when the wind value changes. For example, if the wind is 0 mph for two minutes, sensor 103 may transmit again only when the wind changes to 1 mph or more. This adaptive transmission logic reduces unnecessary communication, conserves battery, while maintaining accuracy when wind conditions vary.

In an embodiment, sensor 103 transmits GPS location data at least once daily, for example during a scheduled morning wake cycle or in response to a server request. Each sensor 103 may be associated with a unique communication identifier corresponding to the hole on which it is located. If sensor 103 is relocated to a different hole, GPS module 203 may update its coordinates, and the identifier may be revised through the cloud or gateway to match the new hole assignment. This ensures that each hole's displays receive only the data from the correct flagstick.

In an embodiment, sensor 103 communicates diagnostic intelligence at least twice daily, such as upon waking and prior to entering a sleep state. Diagnostic information may include battery level, error codes, firmware version, or connectivity status. Sensor 103 may also respond to on-demand requests from a gateway or server for a health check or reset.

In an embodiment, data transmitted by sensor 103 may be structured in a defined format. For example, sensor 103 may output a JSON-based packet including one or more of the following fields: (Note that any suitable data format may be used without departing from the scope or spirit of the system.)

- timestamp (e.g., yyyy/mm/dd hh:mm:ss),
- wind speed in miles per hour,
- wind bearing expressed as an angle from 0° to 359°,
- GPS latitude and longitude,
- battery percentage (1-100%),
- device status code,
- flagstick removal indicator (e.g., 1 for removed, 0 for upright), and
- received signal strength indicator (RSSI).

This structured format provides standardized data for real-time presentation, remote monitoring, and historical analytics.

In an embodiment, sensor 103 is powered by a solar panel(s) 207 coupled with a rechargeable battery 208, with charging controller 209 managing charging and discharge cycles. Sensor 103 may further include a light sensor 210 configured to support wake and sleep transitions, operating primarily during daylight hours. During nighttime sleep mode, non-essential components may be shut down while critical system states are preserved. In an embodiment, standard replaceable batteries may be used, continuous power may be provided by connecting the sensor to a power source. Rechargeable batteries may be used with other recharging mechanisms besides solar, including ports on the sensor to connect to a power source for charging.

In an embodiment, sensor 103 incorporates intelligent power-saving features. For example, telemetry may be transmitted only when wind or other values change, reducing unnecessary communication. Sensor 103 may automatically wake at sunrise based on light and time-based triggers.

In an embodiment, sensor 103 includes a reed switch actuated by a magnet (or other suitable switch) to control operational modes such as on, off, reset, or programming. Mode changes may be acknowledged by audible or visual feedback, such as an LED or buzzer. A USB-C port 211, or other suitable interface, may provide backup charging capability, firmware updates, or emergency diagnostics.

In an embodiment, sensor 103 is enclosed within a weatherproof housing 212, which may be corrosion-resistant and impact-resistant, designed to withstand repeated daily handling and exposure to outdoor conditions. A threaded insert 213 at the base allows attachment to a golf flagstick. Housing 212 may meet or exceed IP67 standards, ensuring protection from dust, water, and UV exposure.

In an embodiment, a custom printed circuit board (PCB) 214 integrates the electronic components of sensor 103, including ultrasonic transducers 201, compass 202, GPS receiver 203, IMU 204, motion sensors 205, communication module 206, charging controller 209, and associated electronics. Sensor 103 may support over-the-air firmware updates delivered through communication module 206, with data port (USB-C) port 211 serving as a backup. The system may comply with global LoRaWAN frequency regulations and RoHS/REACH environmental standards, enabling deployment across courses worldwide.

Sensor 103 Housing

Figure 3:
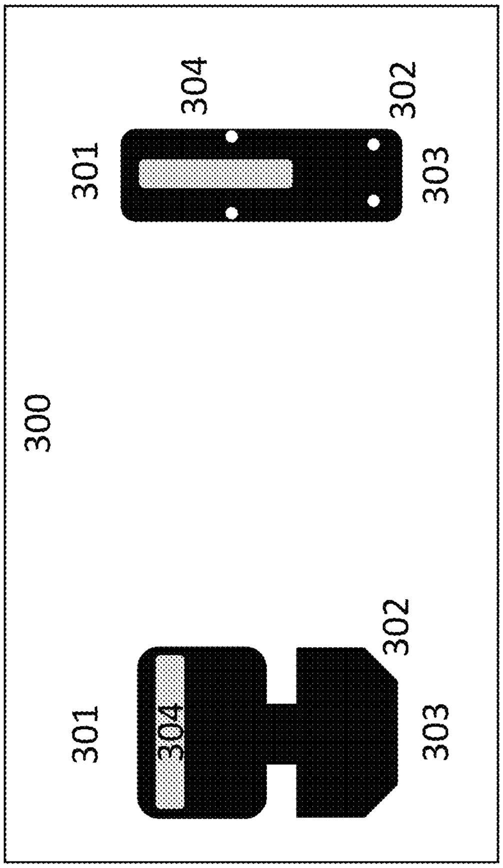
FIG. 3 illustrates the housing of a sensor in an embodiment.

FIG. 3 illustrates the housing of sensor 103 in two embodiments. In the embodiment on the left, the housing 300 includes an upper section 301 and lower section 302. The upper section includes the ultrasonic wind meter and the lower section 302 also includes threaded section 303 for mounting onto a flagstick or on any other suitable structure for locating the housing 300 off the ground. The upper section 304 includes the electronics described with regard to FIG. 2, as well as solar panels 304 on the sides of the housing. The solar panels may be disposed on the upper surface of upper section 301 as desired. In an embodiment, the sensor 103 is implemented in a single body, as shown on the right, without separate upper and lower sections.

Mounted Display

In addition to transmitting information from the sensor to mobile devices, the system may include mounted displays at strategic locations on the grounds of the course, such as near the tee box, the fairway, the rough, and the like. In an embodiment, the displays may be located in a golf cart for providing helpful information wherever the golfer may be located. In an embodiment, the display may also act as a digital flagstick sheet.

Figure 4:
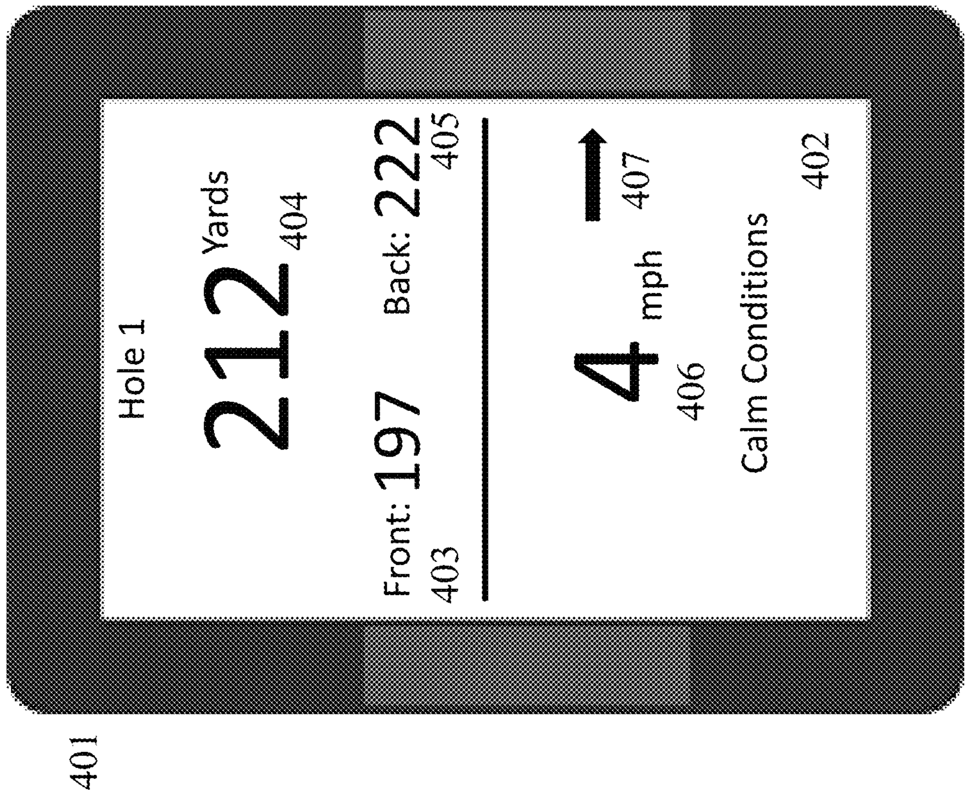
FIG. 4 illustrates a display device in an embodiment.

FIG. 4 illustrates an embodiment of a display 401 configured to present wind, yardage, and flag location information to golfers. Display 401 is mounted on a fixed post approximately three feet above ground level, such as at a tee box, fairway, or other designated location on a golf course. In an embodiment, display 401 is configured to receive data via LoRaWAN from a sensor 103 positioned on a flagstick (or otherwise) and to present the information in real time. Display 401 may be paired each day with the correct sensor 103 based on GPS location and remote server coordination, ensuring that each display only shows data for its assigned hole.

In an embodiment, display 401 includes a suitable display (including, but not limited to, an electronic paper or e-ink screen or any digital display) 402. Screen 402 may be a low-power, non-backlit, monochrome display sized between approximately 7 inches and 11 inches in diagonal dimension. Screen 402 is designed for readability in direct sunlight as well as shaded conditions. Screen 402 may present multiple categories of information, including: distance to the front 403, flagstick 404, and back 405 of the green; wind speed 406 and wind direction 407; and flag or flagstick location information. Wind speed and direction may be updated at a rate of approximately once per second during daylight hours, for example. In some embodiments, wind speed may be displayed with descriptive categories (e.g., "Calm," "Slight," "Moderate," "Strong," or "Significant"), and wind direction may be displayed using golfer-friendly descriptors (e.g., "helping," "hurting," "crosswind left-to-right").

In an embodiment, display 401 further includes a control module and a communication module for receiving data from sensor 103 or from another display, and transmitting diagnostic intelligence to a backend server. Communication module may additionally communicate with a gateway or with meshed displays to improve coverage and reliability.

The backend server may collect and store real-time and historical data on wind conditions and yardage, and may also transmit configuration data and firmware updates to display 401. Display 401 may update its own GPS module daily upon waking, and may calculate the daily distance to the flagstick by applying a geospatial distance formula, such as the haversine formula, to the GPS coordinates of the sensor 103 and the display 401. In an embodiment, the data may be provided to third parties.

In an embodiment, the system may provide data to third parties for use in third party devices for displaying wind and other information to the user. In one embodiment, the data may be provided to a broadcaster for use as part of a televised presentation. In an embodiment, the data may be provided for use in wagering during golf play.

In an embodiment, display 401 incorporates error handling logic. If data transmission is disrupted or flagstick coordinates are unavailable or the flagstick is not in the hole and being held or on the ground, for example, display 401 may revert to default information, such as front, middle, and back green distances without wind data or average wind data from minutes before. Display 401 may also present error feedback to the user, such as icons or messages indicating data status.

In an embodiment, display 401 is powered by a solar panel coupled with a rechargeable battery and a charging controller. A light sensor may be used to support intelligent power management, enabling display 401 to operate primarily during daylight hours and enter a low-power sleep mode at night. During sleep mode, non-essential components such as screen refresh and communication modules may be shut down, while essential system states are preserved. Display 401 may automatically wake at sunrise based on light and time-based triggers. In an embodiment, USB-C port may provide emergency charging capability, firmware updates, and diagnostics. The display may also sleep if no motion is detected and only wakes when an object like a golfer or golf cart is near.

In an embodiment, display 401 is enclosed in an outdoor housing that is weatherproof and UV-resistant, meeting or exceeding IP66 or IP67 standards. Housing may be corrosion-resistant and impact-resistant, designed to survive long-term outdoor exposure in adverse conditions including sunlight, rain, and temperature extremes. Housing may incorporate a universal mounting bracket for attachment to posts of varying material, such as wood, metal, or plastic.

In an embodiment, display 401 includes a custom printed circuit board (PCB) integrating processing and communication modules, GPS module, and supporting electronics. Firmware updates may be delivered over-the-air through communication module, with USB-C port serving as a backup. Display 401 may further include a reed switch with magnet actuation for selecting operational modes, such as on, off, reset, or configuration. Mode changes may be acknowledged by audible or visual feedback, such as an LED indicator or buzzer.

In an embodiment, display 401 supports scalability across a golf course installation, with between 18 and 54 displays deployed. Each display 401 is associated with a specific hole, ensuring that data from a sensor 103 is routed only to the appropriate display. The system may be configured for compliance with global LoRaWAN frequency allocations, as well as CE, RoHS, and REACH environmental and safety standards. Display 401 may be designed for durability testing, including thermal cycling, vibration, dust ingress, and waterproof evaluation, to ensure reliable operation over multiple years.

Figure 5:
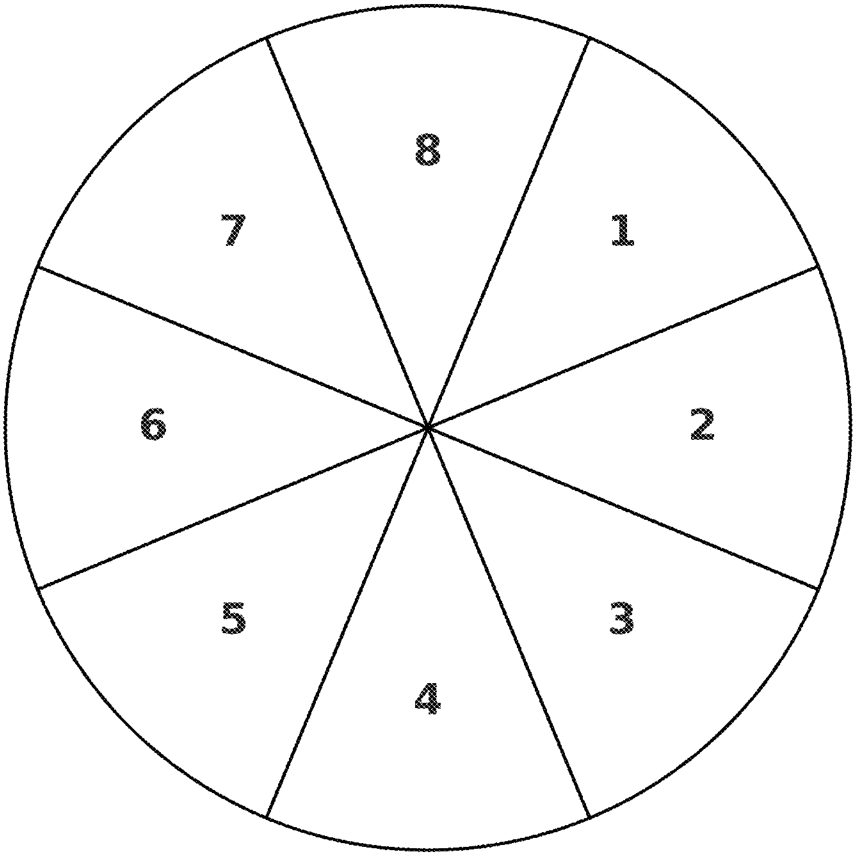
FIG. 5 an example of wind directions in an embodiment.

FIG. 5 illustrates an embodiment of a directional wind indicator 500 divided into eight equal sections. Each section corresponds to a golfer-friendly wind description rather than a traditional compass bearing in degrees. The sections are numbered from 1 to 8.

In an embodiment, the directional wind indicator 500 includes the following segments:

Section 1: Hurting from the right
Section 2: Crosswind right to left
Section 3: Helping from the right
Section 4: Helping
Section 5: Helping from the left
Section 6: Crosswind left to right
Section 7: Hurting from the left
Section 8: Hurting In an embodiment, display 401 may incorporate indicator 500 to present wind direction data received from sensor 103. By mapping measured wind bearing into one of the eight sections, display 401 provides golfers with an intuitive description of how the wind will affect a golf shot. For example, if the wind is blowing directly into the golfer, indicator 500 will highlight section 8 (hurting). If the wind is blowing left to right, indicator 500 will highlight section 6 (crosswind left to right). This golfer-oriented vocabulary enhances usability by providing descriptive terms rather than numerical bearings. It should be noted that these wind directions are relative to the display device being used at the time. For example, two golfers on opposite sides of a fairway, looking at a golf cart displaying the information, will have different wind direction terms based on their respective locations.

In an embodiment, the system may also provide suggestions to the user based on the above wind map. For example, if the wind is from section 4, the system may suggest going down one or more clubs (e.g. move from 5 iron to 7 iron) based on the strength of the wind, since the ball will carry further. Similarly, the system may suggest going up one or more clubs (e.g. pitching wedge to 9 iron when the wind is in section 8. The system can also provide other suggestions. For example, if the wind is in section 6 at 9-11 miles per hour, the display may indicate the following:

Target: Aim 5 yards left of pin
Trajectory: Lower increases control
Club: Remove 1 Club
Spin: Increase for control, slice carries further Other Sports In an embodiment, sensor 103 may be deployed in connection with motor sports. Motor sports is an activity in which outcomes are measured by fractions of a second, and every team and driver seeks marginal advantages in braking, acceleration, aerodynamics, turning, tire wear, fuel efficiency, and other factors.

In the prior art, flags and windsocks are often positioned throughout a race facility to provide visual indications of wind speed and direction. Such indicators may be located on flag poles, grandstands, press boxes, or official stations. In addition, dedicated anemometers are sometimes installed at specific points around a track or on team equipment, such as trailers, garages, or tents. Access to this information is inconsistent and not standardized. Typically, only the visual cues provided by flags are available to all observers, and these cues require line of sight and subjective interpretation. Broader weather data may also be accessed through the internet; however, such data is generally gathered at high elevation, represents regional rather than track-specific conditions, and may be updated only once per hour or less.

As a result, existing solutions combine imprecise visual estimation with sporadically available instrumented data. This reliance on incomplete or delayed information presents a disadvantage in a sport where safety and performance depend on accurate real-time conditions. Sudden gusts, or rapid changes in wind speed and direction, are a common occurrence and can dramatically affect driver decision-making.

Race tracks may extend over miles of terrain and may incorporate significant elevation changes or topographical features, resulting in highly variable wind conditions at different portions of the course. Localized wind patterns at a specific turn, straightaway, or braking zone may differ substantially from those measured at other parts of the facility.

In an embodiment, multiple solar-powered sensors 103 may be distributed around a track, for example twenty or more units, each positioned at a selected location of interest. Each sensor 103 may measure wind speed and direction in real time and communicate the data via LoRa to one or more gateways. The gateways may aggregate the information and transmit it to the cloud, where it can be accessed by teams, officials, or other authorized users. By providing localized, real-time data at key track positions, the system offers a significant improvement over prior approaches and enhances both performance and safety.

In an embodiment, real-time wind data may be used directly by drivers to adapt their approach to a given section of the track. For example, when approaching a high-speed corner with a strong tailwind, a driver may brake earlier and more forcefully than usual to avoid overshooting the turn and risking collision with barriers. Conversely, when entering a straightaway with a strong headwind, a driver may anticipate reduced top speed and modify acceleration strategy accordingly. In crosswind conditions, drivers may adjust steering input and cornering line to maintain stability. These real-time reactions, guided by localized sensor data, provide measurable performance advantages and improve safety by reducing reliance on guesswork.

In an embodiment, sensor 103 may be deployed in connection with baseball. The trajectory of a baseball is highly sensitive to wind speed and direction, particularly for pitched balls, long fly balls, and home run attempts. In the prior art, flags on outfield poles or atop stadiums provide only general visual cues and do not reflect localized variations in wind across the diamond or outfield. By positioning one or more sensors 103 in the outfield, near the foul poles, or above the batter's eye, real-time wind data may be delivered to pitchers, batters, and coaches. For example, a pitcher may adjust pitch selection when facing a strong headwind that increases movement on breaking balls, while a batter may alter swing mechanics when a tailwind increases the likelihood of carrying the ball over the fence.

In an embodiment, sensor 103 may be deployed in connection with skiing. Ski races are often determined by hundredths of a second, and wind gusts can significantly alter speed on downhill or slalom courses. In the prior art, skiers rely on flags or banners positioned near the course, which provide only limited cues. Sensors 103 positioned along key intervals of the slope may provide precise, real-time wind conditions. A skier may react by adjusting stance, edge angle, or tuck position in response to headwinds, tailwinds, or crosswinds encountered at specific gates or straightaways, improving both performance and safety.

In an embodiment, sensor 103 may be deployed in connection with sailing. Wind measurement is central to sailing strategy, and while anemometers are commonly mounted on boats, they reflect only the immediate conditions of that vessel. By deploying sensors 103 on buoys, course markers, or docks, sailors may gain access to localized, real-time wind conditions across the entire racing area. Such information allows tactical decisions on sail trim, tacking, and jibing to be made with greater accuracy. For example, a sailor approaching a buoy with a strong crosswind may choose to tack earlier, or a crew facing gusty headwinds may reef sails sooner to maintain stability and speed.

In an embodiment, sensor 103 may be deployed in connection with tennis. The flight of a tennis ball is strongly influenced by wind, particularly for high tosses on serves, topspin groundstrokes, and lobs. In the prior art, players rely on stadium flags or subjective feel. By locating sensors 103 around the court, real-time data may be delivered to players and coaches. For example, a player may modify serve toss position under crosswind conditions or adjust topspin and slice usage depending on whether a headwind or tailwind is present, thereby improving shot consistency and tactical decision-making.

In an embodiment, sensor 103 may be deployed in connection with soccer (association football). Long passes, free kicks, and corner kicks are particularly sensitive to wind speed and direction, especially in open-air stadiums. In the prior art, teams may observe stadium flags or the movement of the ball during play to infer conditions. By installing sensors 103 near each corner flag or goalpost, localized wind data may be provided in real time. For example, a player preparing to take a corner kick in a strong crosswind may adjust the angle or curve of the ball, while a goalkeeper may reposition to anticipate how wind will alter the ball's trajectory.

In an embodiment, sensor 103 may be deployed in connection with other outdoor sports and activities. For example, in American football, field goal accuracy is often affected by wind, and real-time data from sensors 103 positioned near uprights may improve decision-making. In track and field events, such as javelin, discus, or long jump, wind speed and direction can materially affect performance, and distributed sensors may provide athletes and officials with fair, real-time data. In golf driving ranges or archery fields, localized sensors 103 may provide training insights by correlating performance with wind conditions. In outdoor concerts or events, sensors 103 may be used for safety by detecting gust conditions that threaten staging or temporary structures.

It should be understood that the use of sensor 103 is not limited to the embodiments described above. Sensor 103 may be applied to any outdoor sport, activity, or event in which wind conditions affect performance, safety, or outcomes. Examples include, but are not limited to, golf, baseball, skiing, sailing, tennis, soccer, football, track and field, archery, motorsports, and outdoor entertainment venues. In general, sensor 103 may be deployed wherever real-time, localized wind measurement provides an advantage over existing visual estimation or delayed weather data, and the examples set forth herein are intended to be illustrative rather than limiting.

What is claimed is:

1. An apparatus for providing wind information on a playing or practice field, comprising:

a sensor configured to be mounted on a flagstick, the sensor including an anemometer configured to measure wind speed and direction, wherein the sensor is configured to measure wind conditions at the location;

a communication module within the sensor configured to wirelessly transmit wind data;

a power supply including a solar panel and rechargeable battery configured to power the sensor; and a display configured to receive the wind data from the communication module and to present the wind data to a user via a display in real time.

2. The apparatus of claim 1, wherein the sensor further comprises a GPS module configured to provide location coordinates for the sensor.

3. The apparatus of claim 1, wherein the display comprises a display configured for visibility in direct sunlight.

4. The apparatus of claim 1, wherein the display is configured to present distances to a front, sensor, and back of a green.

5. The apparatus of claim 1, wherein the display is configured to present wind direction using descriptors including "hurting," "helping," or "crosswind".

6. The apparatus of claim 1, wherein the sensor further comprises an inertial measurement unit configured to detect removal of the sensor.

7. The apparatus of claim 1, wherein the sensor is configured to suspend transmission when measured wind speed remains unchanged and to resume transmission when the measured wind speed changes.

8. The apparatus of claim 1, wherein the apparatus includes one or more cameras and/or motion detectors to detect the presence or absence of players near the apparatus.

9. The apparatus of claim 1, wherein the apparatus is configured to transmit diagnostic information including at least one of battery level, error code, or connectivity status.

10. The apparatus of claim 1, wherein the apparatus is configured for deployment in sports selected from the group consisting of golf, baseball, tennis, soccer, skiing, sailing, motorsports, and football.

11. A method of providing real-time wind information for a sporting activity, comprising:

measuring wind speed and direction at a location of play using an anemometer mounted on a flagstick;

wirelessly transmitting the wind speed and direction data to a communication gateway;

providing the wind speed and direction data from the communication gateway to a display device; and presenting the wind speed and direction data on the display.

12. The method of claim 11, further comprising transmitting GPS coordinates from the anemometer to the display device, and calculating distance between a golfer and the flagstick using the GPS coordinates.

13. The method of claim 11, further comprising categorizing the wind speed into descriptive categories including "Calm," "Slight," "Moderate," "Strong," or "Significant".

14. The method of claim 11, wherein presenting the wind direction includes mapping the data into one of eight directional descriptors corresponding to hurting, helping, or crosswind conditions.

15. The method of claim 11, further comprising suspending data transmission when measured wind speed remains unchanged and resuming data transmission when the measured wind speed changes.

16. The method of claim 11, wherein the apparatus includes one or more cameras and/or motion detectors to detect the presence or absence of players near the apparatus.

17. The method of claim 11, further comprising transmitting diagnostic information to a server, the diagnostic information including battery level, device status, or error codes.

18. The method of claim 11, wherein presenting further comprises displaying distance to the front, sensor, and back of a green on display.

19. The method of claim 11, further comprising detecting removal of the sensor using an inertial measurement unit and transmitting a sensor removal indication to the display.

20. The method of claim 11, wherein the sporting activity is selected from the group consisting of golf, baseball, tennis, soccer, skiing, sailing, motorsports, and football.

* * * * *